(12) United States Patent
Xi et al.

(10) Patent No.: US 11,319,864 B2
(45) Date of Patent: May 3, 2022

(54) THERMAL MANAGEMENT SYSTEM AND METHOD FOR HYBRID VEHICLE

(71) Applicant: Xi'an Jiaotong University, Xi'an (CN)

(72) Inventors: Huan Xi, Xi'an (CN); Yiwei Hao, Xi'an (CN); Mingjia Li, Xi'an (CN); Jinhua Wang, Xi'an (CN); Zhuo Ma, Xi'an (CN)

(73) Assignee: Xi'an Jiaotong University, Shaanxi (CN)

( * ) Notice: Subject to any disclaimer, the term of this patent is extended or adjusted under 35 U.S.C. 154(b) by 8 days.

(21) Appl. No.: 17/102,784

(22) Filed: Nov. 24, 2020

(65) Prior Publication Data

US 2021/0156296 A1    May 27, 2021

(30) Foreign Application Priority Data

Nov. 25, 2019 (CN) .......................... 201911163291.5

(51) Int. Cl.
*B60H 1/00* (2006.01)
*F01P 7/14* (2006.01)
(Continued)

(52) U.S. Cl.
CPC ............ *F01P 7/14* (2013.01); *B60H 1/00278* (2013.01); *B60H 1/00385* (2013.01); *B60H 1/00885* (2013.01); *B60H 1/00899* (2013.01); *B60K 6/24* (2013.01); *B60K 6/26* (2013.01); *B60K 6/28* (2013.01); *B60L 58/26* (2019.02); *F01P 3/02* (2013.01); *F01P 3/18* (2013.01); *F01P 5/10* (2013.01); *F16K 11/00* (2013.01); *F16K 15/00* (2013.01); *H02K 5/203* (2021.01); *H02K 9/19* (2013.01); *B60Y 2200/92* (2013.01); *B60Y 2400/11* (2013.01); *B60Y 2400/43* (2013.01); *B60Y 2400/60* (2013.01); *F01P 2003/182* (2013.01); *F01P 2003/185* (2013.01); *F01P 2007/146* (2013.01)

(58) Field of Classification Search
CPC .... B60H 1/00385; B60H 1/20; B60H 1/3213; B60H 2001/00942; B60H 1/004; F01P 2003/182; F01P 2007/146; F01P 2050/24; F16K 11/00; F16K 15/00
See application file for complete search history.

(56) References Cited

U.S. PATENT DOCUMENTS

2016/0031291 A1* 2/2016 Enomoto ........... B60H 1/00385
62/179
2017/0008373 A1* 1/2017 Makihara ........... B60H 1/00828

\* cited by examiner

*Primary Examiner* — George C Jin
*Assistant Examiner* — Teuta B Holbrook
(74) *Attorney, Agent, or Firm* — Optima Law Group, APC; Thomas E. Jurgensen

(57) ABSTRACT

A thermal management system for a hybrid vehicle includes an expander, a heat exchanger, a condenser, a water tank, a pump, a heat exchanger for a battery pack, a heat exchanger for a motor, a water cooling jacket for an engine, an exhaust gas heat exchanger for an engine, a valve, and so on. According to the present disclosure, in thermal management loops, different operating modes of the system can be switched by controlling the open-close and opening of the valve. In this way, a series/parallel connection of thermal management branches of an electrical system and an engine system is fulfilled to meet the requirements for heat dissipation and preheating, and flux in each branch is regulated to fulfill thermal management according to different driving conditions of a hybrid vehicle.

10 Claims, 7 Drawing Sheets

(51) Int. Cl.
*B60L 58/26* (2019.01)
*H02K 5/20* (2006.01)
*B60K 6/24* (2007.10)
*B60K 6/26* (2007.10)
*B60K 6/28* (2007.10)
*F01P 3/02* (2006.01)
*F01P 3/18* (2006.01)
*F01P 5/10* (2006.01)
*F16K 11/00* (2006.01)
*F16K 15/00* (2006.01)
*H02K 9/19* (2006.01)

THERMAL MANAGEMENT SYSTEM AND METHOD FOR HYBRID VEHICLE

CROSS-REFERENCE TO RELATED APPLICATONS

This non-provisional application claims the benefit under 35 U.S.C. 119(a)-(d) of Chinese Application No. 201911163291.5, filed Nov. 25, 2019, the whole disclosure of which is incorporated by reference herein.

TECHNICAL FIELD

The present disclosure relates to the technical field of thermal management of hybrid vehicles, in particular to a thermal management system and method for a hybrid vehicle.

BACKGROUND

To improve energy utilization rates, transform energy utilization systems, and fulfill electrification, new energy utilization, and cleanliness of traffic, hybrid vehicles as new-energy vehicles having great advantages have received much attention in recent years. The technical core of the hybrid vehicles is to make use of respective advantages of motors and engines to fulfill their mutual complementarity and cooperation, so as to enable the engines of the vehicles to operate efficiently for a long time and reach "a peak on a plateau"; and regenerative braking, Atkinson cycle, and the like are additionally adopted, so that the efficiency of energy utilization of the vehicles is significantly improved. A proper thermal management system for the vehicles can further improve the efficiency of the energy utilization of the hybrid vehicles, and thus is one of the most potential research areas at present.

Different from traditional thermal systems or thermal management systems for vehicles, the hybrid vehicles have adjusted internal energy utilization systems so as to fulfill multiple heat sources, multiple temperature zones, variable temperatures, and the like in the whole driving process. Compared with traditional fuel vehicles and electric vehicles, the hybrid vehicles have more complex energy utilization networks and more diverse and complex thermal loads. Many load components, especially batteries, have extremely high requirements on thermal management.

Currently, thermal management systems for most existing hybrid vehicles have thermal management branches independent of one another, that is, batteries, motors, engines, air conditioners, and other thermal management systems are not integrated in the vehicles, which may otherwise result in a low utilization rate of spaces in the vehicles as well as failure to proper distribution and cooperation of heat. Even if this issue has been taken into consideration in a few studies, the systems are relatively simple in form, low in integration level, and not suitable for all driving conditions, and utilize energy in a traditional and simple manner to be improved. The integration of the thermal management systems is very important. The improvement of the integration for combination of thermal management of the vehicles provides a way to reduce costs, weights, and sizes. In addition, power electronics are integrated with the motors to perform the thermal management together with other systems for the existing vehicles, which provides a way to reduce the cost of electrical drive systems.

SUMMARY

To overcome the shortcomings of the prior art, the present disclosure aims to provide a thermal management system and method for a hybrid vehicle to solve the problem that most existing thermal management systems for a hybrid vehicle have low integration level, failure to proper distribution of heat, and a relatively simple form, are not suitable for all driving conditions, and utilize energy traditionally and simply.

To achieve the above objective, the present disclosure adopts the following technical solution:

A thermal management system for a hybrid vehicle includes an expander 9, where an outlet of the expander 9 is connected to an inlet B of a four-way valve 10, an outlet A of the four-way valve 10 is connected to an inlet on a side of a heat exchanger 12, an outlet on this side of the heat exchanger 12 is connected to an inlet of a water tank 14, and an inlet and outlet on another side of the heat exchanger 12 are connected to an air conditioner/heat pump system; an outlet C of the four-way valve 10 is connected to an inlet of a condenser 11, an outlet of the condenser 11 is connected to the inlet of the water tank 14, an outlet of the water tank 14 is connected to an inlet of a pump 15, and an outlet of the pump 15 is connected to inlets of a first check valve 1, a second check valve 2, and a third check valve 3; an outlet of the first check valve 1 is connected to an inlet of a heat exchanger 4 for a battery pack, an outlet of the second check valve 2 is connected to an inlet of a heat exchanger 5 for a motor, and an outlet of the third check valve 3 is connected to an inlet of a water cooling jacket 6 for an engine; and an outlet of the heat exchanger 4 for the battery pack is connected to another inlet of the heat exchanger 5 for the motor, an outlet of the heat exchanger 5 for the motor is connected to another inlet of the water cooling jacket 6 for the engine, an outlet of the water cooling jacket 6 for the engine is connected to an inlet C of a three-way valve 7, an outlet A of the three-way valve 7 is connected to an inlet of an exhaust gas heat exchanger 8, an outlet B of the three-way valve 7 as well as an outlet of the exhaust gas heat exchanger 8 is connected to an inlet of the expander 9, an inlet D of the four-way valve 10, and an inlet of a fourth check valve 13, and an outlet of the fourth check valve 13 is connected to the inlet of the water tank 14.

The first check valve 1, the second check valve 2, and the third check valve 3 may be used to adjust flux.

An air cooled heat exchanger may be adopted as the condenser 11 located on a front section of the vehicle.

Through an adjustment on the valves, the present disclosure further provides a thermal management method based on the thermal management system for a hybrid vehicle, which includes seven operating modes, namely a waste heat power generation mode, a first heat dissipation mode, a second heat dissipation mode, a third heat dissipation mode, a waste heat utilization mode, a preheating mode, and a mutual preheating mode.

Compared with the prior art, the present disclosure can fulfill, by controlling the openings and open-close of the valves, cooling of series/parallel-connected battery, motor, and engine, flux control over a coolant, and mutual preheating among power units, and recover, by means of the exhaust gas heat exchanger and the expander, waste heat from all power units to perform power generation. Furthermore, the present disclosure can couple the air conditioner/heat pump system with the thermal management system by means of the heat exchanger to fulfill waste heat recovery or additional thermal management, and can fulfill, through proper configuration of the four-way valve, the three-way valve, and the check valves, simple control to meet the requirements for different driving conditions.

DETAILED DESCRIPTION

The implementations of the present disclosure are expounded below with reference to the accompanying drawings and embodiments.

Figure 1:
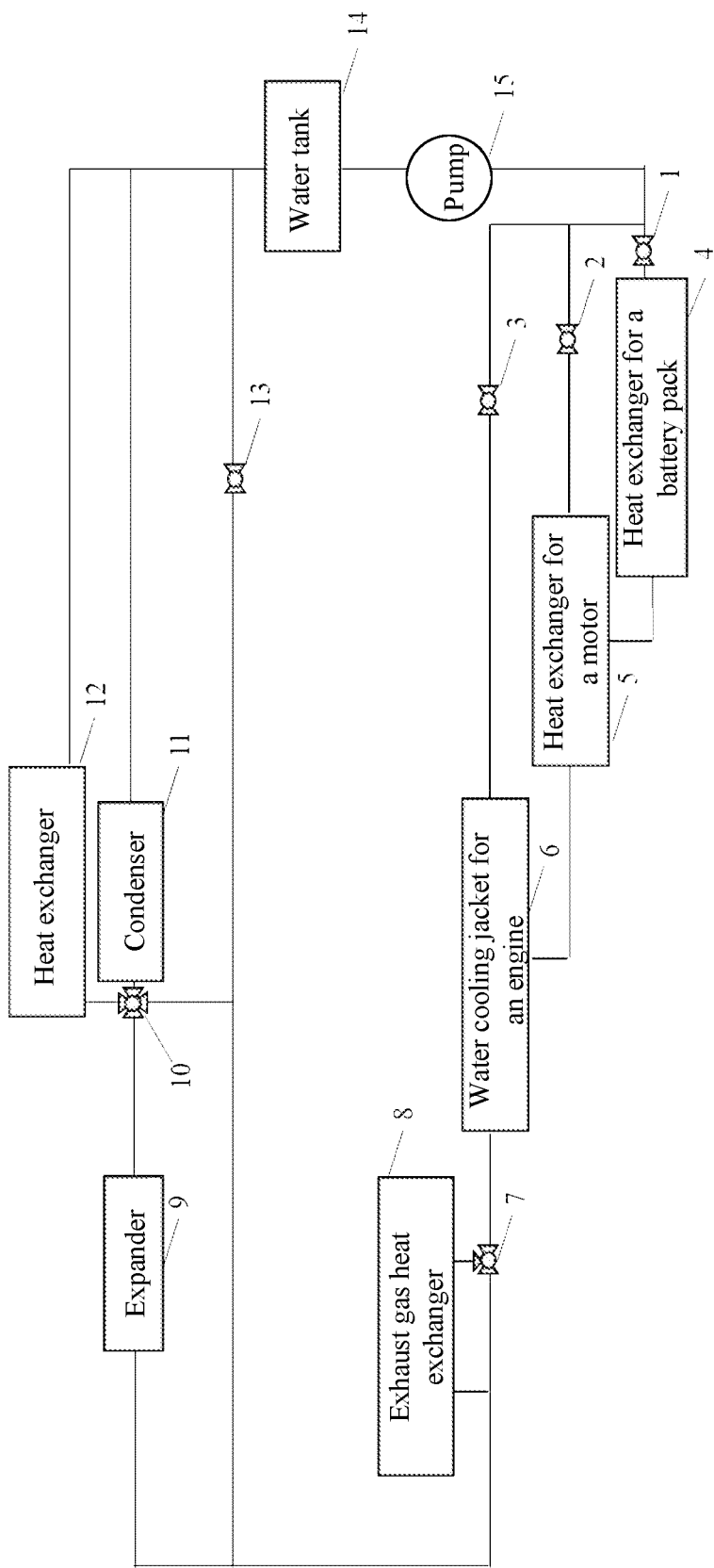
FIG. 1 is a thermal management system for a hybrid vehicle according to the present disclosure.
Figure 7:
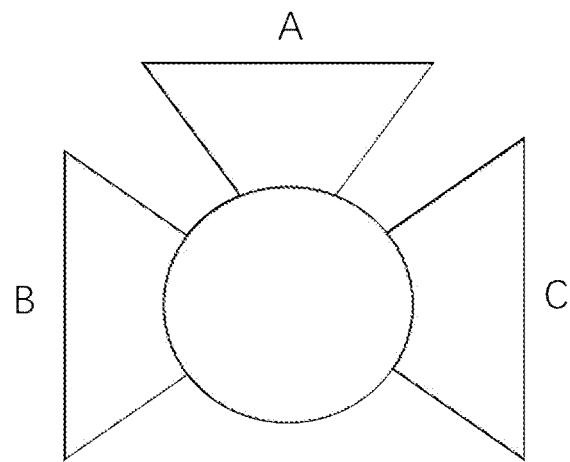
FIG. 7 is a three-way valve and shows configuration of its ports according to the present disclosure.
Figure 8:
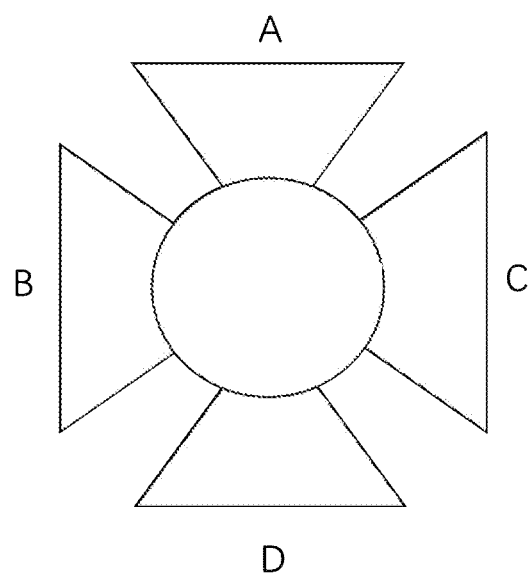
FIG. 8 is a four-way valve of the present disclosure and shows configuration of its ports according to the present disclosure.

As shown in FIG. 1, FIG. 7, and FIG. 8, a thermal management system for a hybrid vehicle of the present disclosure includes an expander 9, where an outlet of the expander 9 is connected to an inlet B of a four-way valve 10, an outlet A of the four-way valve 10 is connected to an inlet on a side of a heat exchanger 12, an outlet on this side of the heat exchanger 12 is connected to an inlet of a water tank 14, and an inlet and outlet on another side of the heat exchanger 12 are connected to an air conditioner/heat pump system; an outlet C of the four-way valve 10 is connected to an inlet of a condenser 11, an outlet of the condenser 11 is connected to the inlet of the water tank 14; an air cooled heat exchanger may be adopted as the condenser 11 located on a front section of the vehicle; an outlet of the water tank 14 is connected to an inlet of a pump 15, and an outlet of the pump 15 is connected to inlets of a first check valve 1, a second check valve 2, and a third check valve 3; and the first check valve 1, the second check valve 2, and the third check valve 3 can be used to adjust flux as required.

An outlet of the first check valve 1 is connected to an inlet of a heat exchanger 4 for a battery pack, an outlet of the second check valve 2 is connected to an inlet of a heat exchanger 5 for a motor, an outlet of the third check valve 3 is connected to an inlet of a water cooling jacket 6 for an engine, an outlet of the heat exchanger 4 for the battery pack is connected to another inlet of the heat exchanger 5 for the motor, an outlet of the heat exchanger 5 for the motor is connected to another inlet of the water cooling jacket 6 for the engine, an outlet of the water cooling jacket 6 for the engine is connected to an inlet C of a three-way valve 7, an outlet A of the three-way valve 7 is connected to an inlet of an exhaust gas heat exchanger 8, an outlet B of the three-way valve 7 as well as an outlet of the exhaust gas heat exchanger 8 is connected to an inlet of the expander 9, an inlet D of the four-way valve 10, and an inlet of a fourth check valve 13, and an outlet of the fourth check valve 13 is connected to the inlet of the water tank 14.

Where, a series-connected channel is formed from the outlet of the heat exchanger 4 for the battery pack to the inlet of the heat exchanger 5 for the motor to the outlet of the heat exchanger 5 for the motor to the inlet of the water cooling jacket 6 for the engine to the outlet of the water cooling jacket 6 for the engine; and a parallel-connected channel is formed from the outlet of the pump 15 to the inlet of the heat exchanger 4 for the battery pack, the inlet of the heat exchanger 5 for the motor, and the inlet of the water cooling jacket 6 for the engine.

A thermal management method for a hybrid vehicle of the present disclosure fulfills the following seven operating modes according to different operating conditions.

1. A waste heat power generation mode: in a case where high-grade waste heat is generated when an electric loop and an engine loop operate simultaneously, the fourth check valve 13, a C-B channel of the three-way valve 7, and a D-A channel, D-C channel, and B-A channel of the four-way valve 10 are closed to recover the waste heat for power generation.

Figure 2:
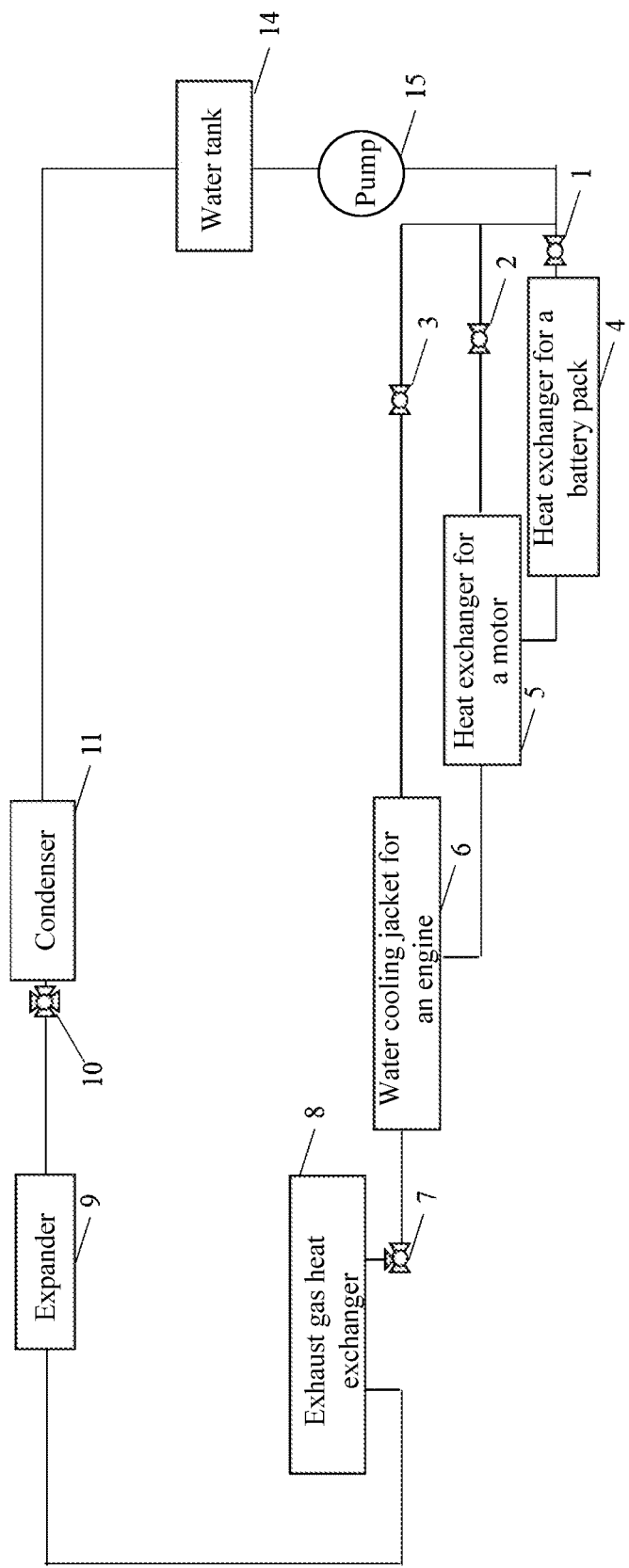
FIG. 2 is a waste heat power generation loop formed by power units according to the present disclosure.

The specific circulation process in this mode is: a cold working substance is divided into three branches via the pump 15 to flow through the heat exchanger 4 for the battery pack, the heat exchanger 5 for the motor, and the water cooling jacket 6 for the engine to absorb heat from thermal loads for heat dissipation of the thermal loads. The check valves on the branches have a controllable opening; in this way, flux as well as flow and stop of the cold working substance flowing through the thermal loads on the branches can be separately controlled, so that different requirements for heat dissipation of the branches can be met. To fulfill optimal flux of the working substance, the temperature of the thermal loads is regulated to be within an appropriate range through cooperation of the series-connected channel and the parallel-connected channel. Subsequently, the working substance flows into the exhaust gas heat exchanger 8 via a C-A channel of the three-way valve 7 to absorb heat from a high-temperature exhaust gas and then flows into the expander 9 to output electric power by being applied; and the applied working substance flows into the condenser 11 via a B-C channel of the four-way valve 10 for heat dissipation, then flows into the water tank 14, and afterwards flows into the pump 15 for a next cycle. FIG. 2 shows a circulation loop from the pump 15 to the first check valve 1, the second check valve 2, and the third check valve 3 to the heat exchanger 4 for the battery pack, the heat exchanger 5 for the motor, and the water cooling jacket 6 for the engine to the three-way valve 7 to the exhaust gas heat exchanger 8 to the expander 9 to the four-way valve 10 to the condenser 11 to the water tank 14 to the pump 15.

The circulation principle in this mode is: a saturated liquid working substance from the water tank flows through the pump to become a supercooled liquid working substance; then the supercooled liquid working substance flows into the heat exchanger 4 for the battery pack, the heat exchanger 5 for the motor, and the water cooling jacket 6 for the engine to absorb the heat from the thermal loads, so as to become a superheated gaseous working substance; after that, the superheated gaseous working substance having a high temperature and a higher pressure flows into the expander 9 to be applied for power generation; and afterwards, dead steam enters the condenser 11 to release heat to return to an initial circulation state, and then enters the water tank 14 to complete a cycle.

2. A first heat dissipation mode: in a case where only an electrical system is turned on and the expander 9 cannot operate because the thermal loads are not sufficient, the fourth check valve 13, the third check valve 3, the C-A channel of the three-way valve 7, and the D-A channel, B-C channel, and B-A channel of the four-way valve 10 are closed, and only the condenser 11 in an air cooling mode is used for heat dissipation.

Figure 3:
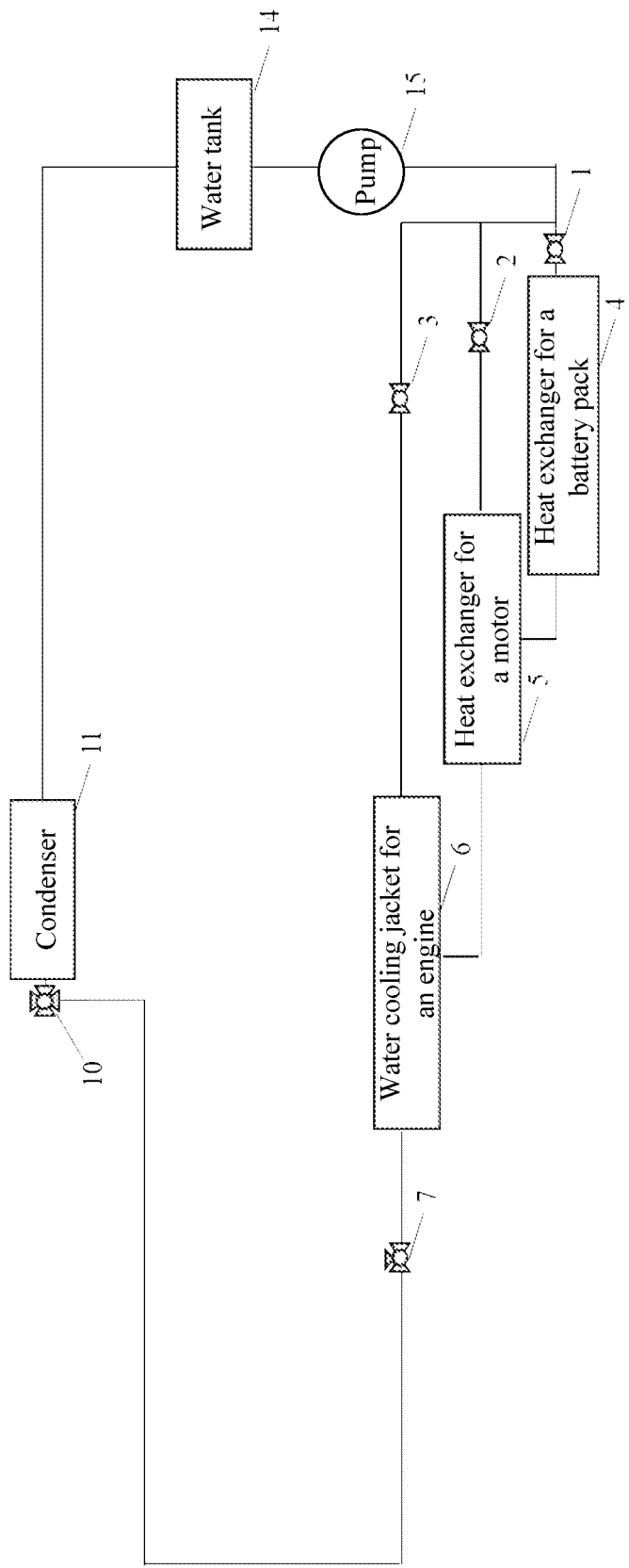
FIG. 3 is a first heat dissipation loop formed by power units according to the present disclosure.

The specific circulation process in this mode is: a cold working substance is divided into two branches via the pump 15 to flow through the heat exchanger 4 for the battery pack and the heat exchanger 5 for the motor and then flow into the water cooling jacket 6 for the engine to release part of heat; the working substance flowing out of the water cooling jacket 6 for the engine directly flows, via the C-B channel of the three-way valve 7 and the D-C channel of the four-way valve 10, into the condenser 11 to be condensed; and the condensed working substance flows into the water tank 14 and then flows into the pump 15 for a next cycle. FIG. 3 shows a circulation loop from the pump 15 to the first check valve 1, the second check valve 2, and the third check valve 3 to the heat exchanger 4 for the battery pack, the heat exchanger 5 for the motor, and the water cooling jacket 6 for the engine to the three-way valve 7 to the four-way valve 10 to the condenser 11 to the water tank 14 to the pump 15.

The circulation principle in this mode is: a liquid working substance is driven by the pump to flow through the heat exchanger 4 for the battery pack and the heat exchanger 5 for the motor and absorb heat; after that, the working substance flows into the water cooling jacket 6 for the engine to release part of heat while transferring part of heat to an engine cylinder to warm the cylinder, then flows into the condenser 11 to release the rest of heat to an ambient atmosphere, and afterwards flows back into the water tank 14 to complete a cycle.

3. A second heat dissipation mode: in a case where only the electrical system is turned on, the expander 9 cannot be driven to operate because the thermal loads are moderate, and air cooling cannot completely meet the requirement for heat dissipation of the thermal loads, the fourth check valve 13, the third check valve 3, the C-A channel of the three-way valve 7, and the B-C channel and B-A channel of the four-way valve 10 are closed, a loop of the heat exchanger 12 is opened by means of the four-way valve 10 to divert part of the working substance, and thermal management is fulfilled by the air conditioner/heat pump system.

Figure 4:
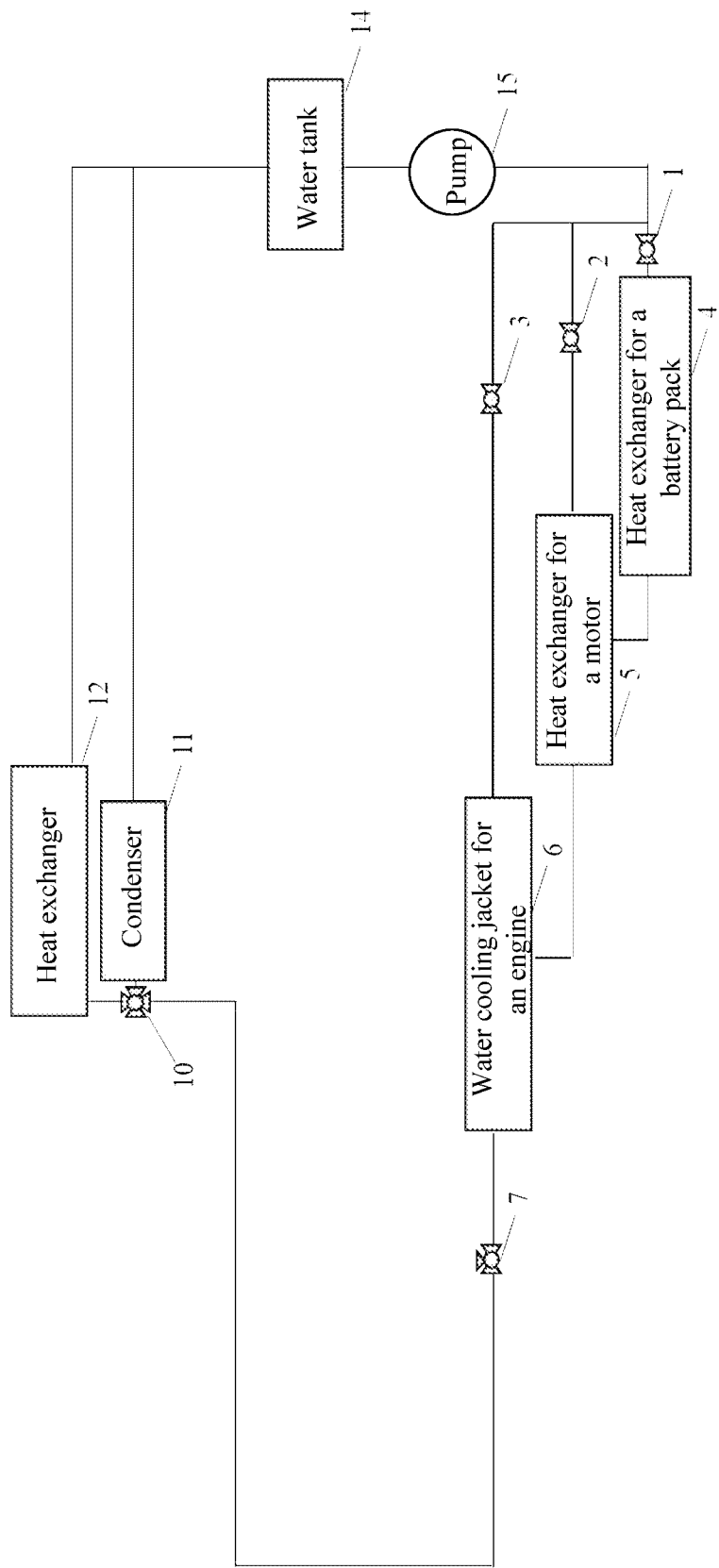
FIG. 4 is a second heat dissipation loop formed by power units according to the present disclosure.

The specific circulation process in this mode is: a cold working substance is divided into two branches via the pump 15 to flow through the heat exchanger 4 for the battery pack and the heat exchanger 5 for the motor and then flow into the water cooling jacket 6 for the engine to release part of heat; the working substance flowing out of the water cooling jacket 6 for the engine flows, via the C-B channel of the three-way valve 7 and the D-C channel and D-A channel of the four-way valve 10, into the condenser 11 and the heat exchanger 12 for heat dissipation performed in an air cooling manner in the condenser 11 and performed, in the heat exchanger 12, by means of a working substance in the air conditioner/heat pump system connected to the heat exchanger 12; and after that, the working substance flows into the water tank 14 and then flows into the pump 15 for a next cycle. FIG. 4 shows a circulation loop from the pump 15 to the first check valve 1, the second check valve 2, and the third check valve 3 to the heat exchanger 4 for the battery pack, the heat exchanger 5 for the motor, and the water cooling jacket 6 for the engine to the three-way valve 7 to the four-way valve 10 to the condenser 11 and the heat exchanger 12 to the water tank 14 to the pump 15.

The circulation principle in this mode is: a liquid working substance is driven by the pump to flow through the heat exchanger 4 for the battery pack and the heat exchanger 5 for the motor and absorb heat; after that, the working substance flows into the water cooling jacket 6 for the engine to release part of heat while transferring part of heat to the engine cylinder to warm the cylinder, then flows into the condenser 11 and the heat exchanger 12 to release the rest of heat to an ambient atmosphere and a working substance flowing in the air conditioner/heat pump system, and afterwards flows back into the water tank 14 to complete a cycle.

4. A third heat dissipation mode: in a case where only the electrical system is turned on and the thermal loads are considerably higher than a set value, the fourth check valve 13, the third check valve 3, the C-A channel of the three-way valve 7, and the D-C channel, B-C channel, and B-A channel of the four-way valve 10 are closed, and the air conditioner/heat pump system is used to intensify heat dissipation of the electrical system.

The specific circulation process in this mode is: a cold working substance is divided into two branches via the pump 15 to flow through the heat exchanger 4 for the battery pack and the heat exchanger 5 for the motor and then flow into the water cooling jacket 6 for the engine to release part of heat; the working substance flowing out of the water cooling jacket 6 for the engine flows, via the C-B channel of the three-way valve 7 and the D-A channel of the four-way valve 10, into the heat exchanger 12 for heat dissipation; and afterwards, the working substance flows into the water tank 14 and then flows into the pump 15 for a next cycle.

The circulation principle in this mode is: a liquid working substance is driven by the pump to flow through the heat exchanger 4 for the battery pack and the heat exchanger 5 for the motor and absorb heat; after that, the working substance flows into the water cooling jacket 6 for the engine to release part of heat while transferring part of heat to the engine cylinder to warm the cylinder, then flows into the heat exchanger 12 to release the rest of heat to the working substance flowing in the air conditioner/heat pump system, and afterwards flows back into the water tank 14 to complete a cycle.

5. A waste heat utilization mode: in a case where a passenger compartment needs heating, the fourth check valve 13, the C-A channel of the three-way valve 7, and the D-C channel, B-C channel, and B-A channel of the four-way valve 10 are closed, and waste heat from a dynamic load is transferred to the passenger compartment by means of the heat exchanger 12 and the air conditioner/heat pump system, so as to reduce power consumption of the air conditioner/heat pump system.

The specific circulation process in this mode is: a cold working substance is divided into three branches via the pump 15 to flow through the heat exchanger 4 for the battery pack, the heat exchanger 5 for the motor, and the water cooling jacket 6 for the engine to absorb heat from the thermal loads; and subsequently, the working substance flows, via the C-B channel of the three-way valve 7 and the D-A channel of the four-way valve 10, into the heat exchanger 12 to transfer the heat to the working substance in the air conditioner/heat pump system; and afterwards, the working substance flows into the water tank 14 and then flows into the pump 15 for a next cycle.

The circulation principle in this mode is: a liquid working substance is driven by the pump to flow through the heat exchanger 4 for the battery pack, the heat exchanger 5 for the motor, and the water cooling jacket 6 for the engine and absorb heat, then flows into the heat exchanger 12 to release the heat to the working substance flowing in the air conditioner/heat pump system, and afterwards flows back into the water tank 14 to complete a cycle. The air conditioner/heat pump system has the power consumption lowered during the heating by using the waste heat from the thermal load in the heat exchanger 12.

6. A preheating mode: in a case where the dynamic load needs to be previously heated in cold weather, the fourth check valve 13, the C-A channel of the three-way valve 7, and the D-C channel, B-C channel, and B-A channel of the four-way valve 10 are closed, and the air conditioner/heat pump system and the heat exchanger 12 are used to provide heat for a loop of the dynamic load.

The specific circulation process in this mode is: a cold working substance is divided into three branches via the pump 15 to flow through the heat exchanger 4 for the battery pack, the heat exchanger 5 for the motor, and the water cooling jacket 6 for the engine to provide the heat for the dynamic load; and subsequently, the working substance flows, via the C-B channel of the three-way valve 7 and the D-A channel of the four-way valve 10, into the heat exchanger 12 to absorb heat from the air conditioner/heat pump system; and afterwards, the working substance flows into the water tank 14 and then flows into the pump 15 for a next cycle.

The circulation principle in this mode is: a liquid working substance flows through the heat exchanger 12 and absorbs the heat from the air conditioner/heat pump system; then the working substance is driven by the pump to flow into the heat exchanger 4 for the battery pack, the heat exchanger 5 for the motor, and the water cooling jacket 6 for the engine to release the heat to the thermal loads for preheating; and afterwards, the cold working substance flows into the heat exchanger 12 for heat absorption to complete a cycle.

Figure 5:
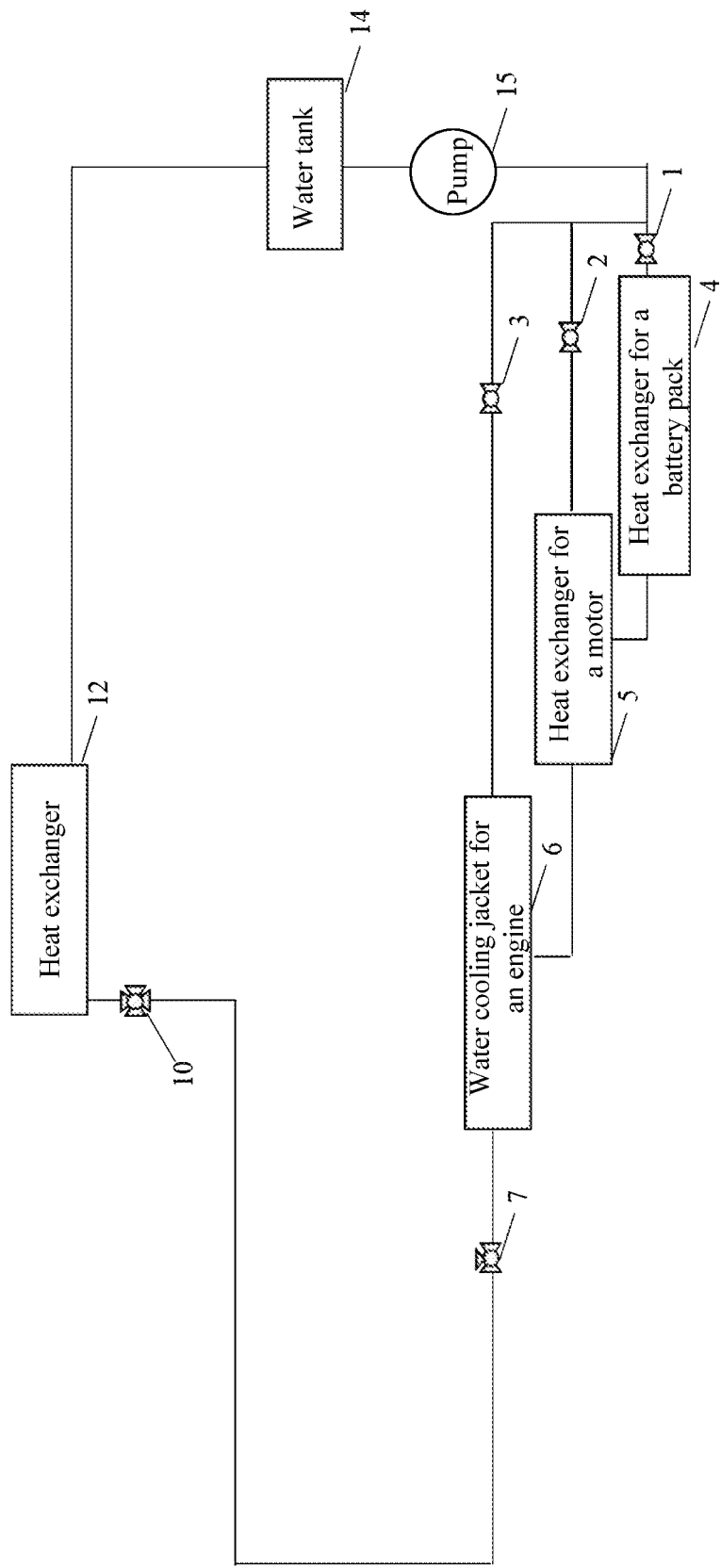
FIG. 5 is a third heat dissipation loop/waste heat utilization loop/preheating loop formed by power units according to the present disclosure.

FIG. 5 shows a circulation loop from the pump 15 to the first check valve 1, the second check valve 2, and the third check valve 3 to the heat exchanger 4 for the battery pack, the heat exchanger 5 for the motor, and the water cooling jacket 6 for the engine to the three-way valve 7 to the four-way valve 10 to the heat exchanger 12 to the water tank 14 to the pump 15 in the third heat dissipation mode, the waste heat utilization mode, and the preheating mode.

7. A mutual preheating mode: when an engine system or the electrical system operates, the third check valve 3, the C-A channel of the three-way valve 7, and all the channels of the four-way valve 10 are closed to make the electrical system be heated by means of waste heat from the engine system or the engine system be heated by means of waste heat from the electrical system.

Figure 6:
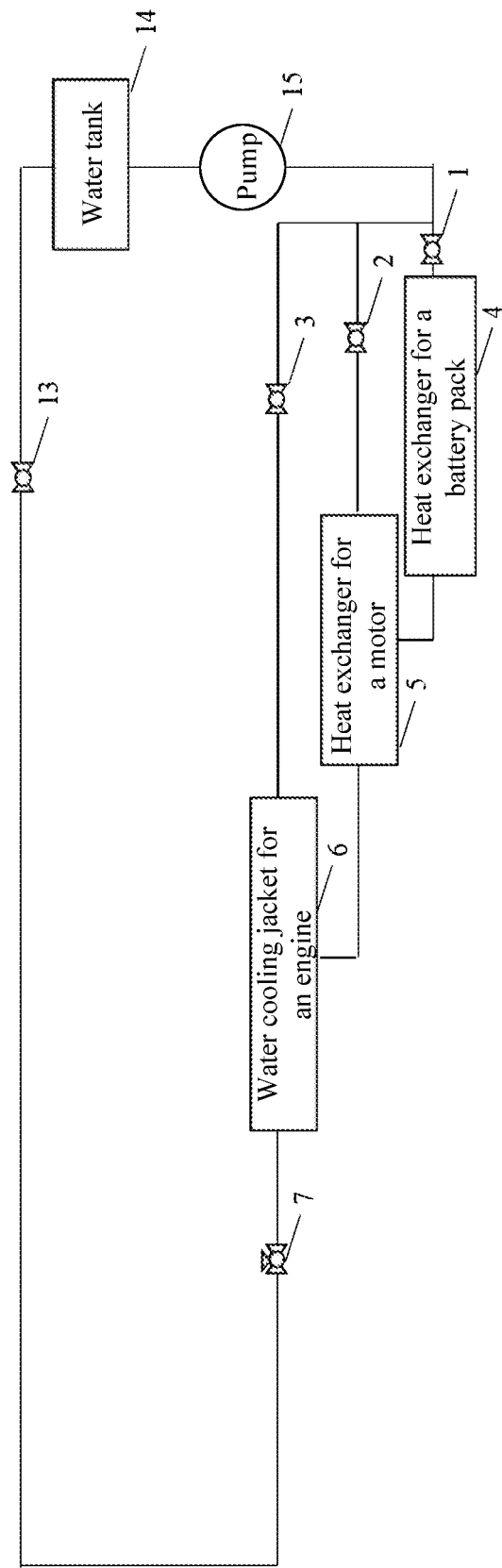
FIG. 6 is a mutual preheating loop according to the present disclosure.

The specific circulation process in this mode is: a cold working substance is divided into two branches via the pump 15 to flow through the heat exchanger 4 for the battery pack and the heat exchanger 5 for the motor and then flow into the water cooling jacket 6 for the engine to release part of heat; the working substance flowing out of the water cooling jacket 6 for the engine flows, via the C-B channel of the three-way valve 7 and through the fourth check valve 13, into the water tank 14 and then flows into the pump 15 for a next cycle. FIG. 6 shows a circulation loop from the pump 15 to the first check valve 1, the second check valve 2, and the third check valve 3 to the heat exchanger 4 for the battery pack, the heat exchanger 5 for the motor, and the water cooling jacket 6 for the engine to the three-way valve 7 to the fourth check valve 13 to the water tank 14 to the pump 15.

The circulation principle in this mode is: a working substance is driven by the pump 15 to successively flow through the heat exchanger 4 for the battery pack, the heat exchanger 5 for the motor, and the water cooling jacket 6 for the engine. If only the electrical system operates, the working substance flows through the heat exchanger 4 for the battery pack and the heat exchanger 5 for the motor to absorb heat released from batteries and a motor, and then flows through the water cooling jacket 6 for the engine to release the heat to warm the engine cylinder. If only the engine system operates, the working substance flows through the water cooling jacket 6 for the engine to absorb the heat, and then flows into the pump 15 to be driven by the pump 15 to flow into the heat exchanger 5 for the motor and the water cooling jacket 6 for the engine to release the heat to preheat the batteries and the motor.

In summary, in the thermal management loops, different operating modes of the system can be switched by controlling open-close and openings of the valves. In this way, a series/parallel connection of thermal management branches of the electrical system and the engine system is fulfilled to meet the requirements for the heat dissipation and the preheating, and the flux of the working substance in the branches is regulated to fulfill thermal management according different driving conditions of a hybrid vehicle. According to the present disclosure, the expander together with the condenser and the heat exchanger is used to fulfill waste heat recovery, where the air conditioner/heat pump system is connected to the heat exchanger to perform additional thermal management on a dynamical system. The whole system has high integration level, less space occupation, and wide application conditions and can effectively improve the efficiency of energy utilization of the hybrid vehicle.

What is claimed is:

1. A thermal management system for a hybrid vehicle, comprising:
   (a) an expander, wherein an outlet of the expander is connected to an inlet B of a four-way valve, an outlet A of the four-way valve is connected to an inlet on a side of a heat exchanger, an outlet on the side of the heat exchanger is connected to an inlet of a water tank, and an inlet and outlet on another side of the heat exchanger are connected to an air conditioner/heat pump system;
   (b) an outlet C of the four-way valve is connected to an inlet of a condenser, an outlet of the condenser is connected to the inlet of the water tank, an outlet of the water tank is connected to an inlet of a pump, and an outlet of the pump is connected to inlets of a first check valve, a second check valve, and a third check valve;
   (c) an outlet of the first check valve is connected to an inlet of a heat exchanger for a battery pack, an outlet of the second check valve is connected to an inlet of a heat exchanger for a motor, and an outlet of the third check valve is connected to an inlet of a water cooling jacket for an engine;
   (d) and an outlet of the heat exchanger for the battery pack is connected to another inlet of the heat exchanger for the motor, an outlet of the heat exchanger for the motor is connected to another inlet of the water cooling jacket for the engine, an outlet of the water cooling jacket for the engine is connected to an inlet C of a three-way valve, an outlet A of the three-way valve is connected to an inlet of an exhaust gas heat exchanger, an outlet B of the three-way valve as well as an outlet of the exhaust gas heat exchanger is connected to an inlet of the expander, an inlet D of the four-way valve, and an inlet of a fourth check valve, and an outlet of the fourth check valve is connected to the inlet of the water tank.

2. The thermal management system for a hybrid vehicle according to claim 1, wherein the first check valve, the second check valve, and the third check valve can be used to adjust flux.

3. The thermal management system for a hybrid vehicle according to claim 1, wherein an air-cooled heat exchanger is adopted as the condenser located on a front section of the vehicle.

4. A thermal management method based on the thermal management system for a hybrid vehicle according to claim 1, wherein
   (a) in a case where waste heat on a grade, which is generated when an electric loop and an engine loop operate simultaneously, can be recovered for power generation, the fourth check valve, a C-B channel of the three-way valve, and other D-A channels, D-C channel, and B-A channel of the four-way valve are closed;
   (b) a specific circulation process is where a cold working substance is divided into three branches via the pump to flow through the heat exchanger for the battery pack, the heat exchanger for the motor, and the water cooling jacket for the engine to absorb heat from thermal loads for heat dissipation of the thermal loads;
   (c) subsequently, the working substance flows into the exhaust gas heat exchanger via a C-A channel of the three-way valve to absorb heat from a high-temperature exhaust gas and then flows into the expander to output electric power by being applied; and
   (d) the applied working substance flows into the condenser via a B-C channel of the four-way valve for heat dissipation, then flows into the water tank, and afterwards flows into the pump for a next cycle; and in this way, a waste heat power generation mode is completed.

5. The thermal management method based on the thermal management system for a hybrid vehicle according to claim 1, wherein in a case where only an electrical system is turned on and the expander cannot operate because the thermal loads are not sufficient, only the condenser in an air cooling mode is used for heat dissipation, and the fourth check valve, the third check valve, the C-A channel of the three-way valve, and the D-A channel, B-C channel, and B-A channel of the four-way valve are closed; and wherein a specific circulation process is: a cold working substance is divided into two branches via the pump to flow through the heat exchanger for the battery pack and the heat exchanger for the motor and then flow into the water cooling jacket for the engine to release part of heat; the working substance flowing out of the water cooling jacket for the engine directly flows, via the C-B channel of the three-way valve and the D-C channel of the four-way valve, into the condenser to be condensed; the condensed working substance flows into the water tank and then flows into the pump for a next cycle; and in this way, a first heat dissipation mode is completed.

6. The thermal management method based on the thermal management system for a hybrid vehicle according to claim 1, wherein in a case where only an electrical system is turned on, the expander cannot operate because the thermal loads are not sufficient, and air cooling cannot completely meet the requirement for heat dissipation of the thermal loads, the fourth check valve, the third check valve, the C-A channel of the three-way valve, and the B-C channel and B-A channel of the four-way valve are closed; a loop of the heat exchanger is opened by means of the four-way valve to divert part of a working substance; and in this way, thermal management is fulfilled by the air conditioner/heat pump system; and wherein a specific circulation process is: a cold working substance is divided into two branches via the pump to flow through the heat exchanger for the battery pack and the heat exchanger for the motor and then flow into the water cooling jacket) for the engine to release part of heat; the working substance flowing out of the water cooling jacket for the engine flows, via the C-B channel of the three-way valve and the D-C channel and D-A channel of the four-way valve, into the heat exchanger and the condenser for heat dissipation; after that, the working substance flows into the water tank and then flows into the pump for a next cycle; and in this way, a second heat dissipation mode is completed.

7. The thermal management method based on the thermal management system for a hybrid vehicle according to claim 1, wherein in a case where only an electrical system is turned on and the thermal loads are considerably higher than a set value, the fourth check valve, the third check valve, the C-A channel of the three-way valve, and the D-C channel, B-C channel, and B-A channel of the four-way valve are closed, and the air conditioner/heat pump system is used to intensify heat dissipation of the electrical system; a specific circulation process is: and wherein a cold working substance is divided into two branches via the pump to flow through the heat exchanger for the battery pack and the heat exchanger for the motor and then flow into the water cooling jacket for the engine to release part of heat; the working substance flowing out of the water cooling jacket for the engine flows, via the C-B channel of the three-way valve and the D-A channel of the four-way valve, into the heat exchanger for heat dissipation; afterwards, the working substance flows into the water tank and then flows into the pump for a next cycle; and in this way, a third heat dissipation mode is completed.

8. The thermal management method based on the thermal management system for a hybrid vehicle according to claim 1, wherein in a case where a passenger compartment needs heating, the fourth check valve, the C-A channel of the three-way valve, and the D-C channel, B-C channel, and B-A channel of the four-way valve are closed, and waste heat from a dynamic load is transferred to the passenger compartment by means of the heat exchanger and the air conditioner/heat pump system, so as to reduce power consumption of the air conditioner/heat pump system; and wherein a specific circulation process is: a cold working substance is divided into three branches via the pump to flow through the heat exchanger for the battery pack, the heat exchanger for the motor, and the water cooling jacket for the engine to absorb heat from the thermal loads; and subsequently, the working substance flows, via the C-B channel of the three-way valve and the D-A channel of the four-way valve, into the heat exchanger to transfer the heat to a working substance in the air conditioner/heat pump system; afterwards, the working substance flows into the water tank and then flows into the pump for a next cycle; in this way, a waste heat utilization mode is completed.

9. The thermal management method based on the thermal management system for a hybrid vehicle according to claim 1, wherein in a case where a dynamic load needs to be previously heated in cold weather, the fourth check valve, the C-A channel of the three-way valve, and the D-C channel, B-C channel, and B-A channel of the four-way valve are closed, and the air conditioner/heat pump system and the heat exchanger are used to provide heat for a loop of the dynamic load; and wherein a specific circulation process is a cold working substance is divided into three branches via the pump to flow through the heat exchanger for the battery pack, the heat exchanger for the motor, and the water cooling jacket for the engine to provide the heat for the dynamic load; and wherein subsequently, the working substance flows, via the C-B channel of the three-way valve and the D-A channel of the four-way valve, into the heat exchanger to absorb heat from the air conditioner/heat pump system; and further wherein afterwards, the working substance flows into the water tank and then flows into the pump for a next cycle; and in this way, a preheating mode is completed.

10. The thermal management method based on the thermal management system for a hybrid vehicle according to claim 1, wherein when an engine system or an electrical system operates, the third check valve, the C-A channel of the three-way valve, and all the channels of the four-way valve are closed to make the electrical system be heated by means of waste heat from the engine system or the engine system be heated by means of waste heat from the electrical system; and wherein a specific circulation process is: a cold working substance is divided into two branches via the pump to flow through the heat exchanger for the battery pack and the heat exchanger for the motor and then flow into the water cooling jacket for the engine to release part of heat; the working substance flowing out of the water cooling jacket for the engine flows, via the C-B channel of the three-way valve and through the fourth check valve, into the water tank and then flows into the pump for a next cycle, and in this way, a mutual preheating mode is completed.

* * * * *